United States Patent [19]

Gray

[11] Patent Number: 5,678,205
[45] Date of Patent: Oct. 14, 1997

[54] COMBINATION HEAD-PROTECTIVE HELMET AND COMMUNICATIONS SYSTEM

[75] Inventor: Robert E. Gray, Glen Mills, Pa.

[73] Assignee: CairnsAir, Inc., New Castle, Del.

[21] Appl. No.: 360,578

[22] Filed: Dec. 21, 1994

[51] Int. Cl.[6] ........................................ H04B 1/38
[52] U.S. Cl. .......................... 455/90; 455/348; 455/351
[58] Field of Search ............................. 455/66, 89, 90, 455/344, 346, 347, 348, 349, 350, 351; 2/5, 422; 343/718

[56] References Cited

U.S. PATENT DOCUMENTS

| | | | |
|---|---|---|---|
| 2,942,072 | 6/1960 | Cunningham. | |
| 4,829,599 | 5/1989 | Giorgio et al. | 2/5 |
| 4,833,726 | 5/1989 | Shinoda et al. | 455/351 |
| 5,090,054 | 2/1992 | Grilliot et al. | |
| 5,119,505 | 6/1992 | Tisseroni et al. | 455/350 |
| 5,404,577 | 4/1995 | Zuckerman et al. | 455/66 |

FOREIGN PATENT DOCUMENTS

| 681841 | 5/1993 | Switzerland | 455/344 |
|---|---|---|---|

*Primary Examiner*—Edward F. Urban
*Attorney, Agent, or Firm*—Connolly & Hutz

[57] ABSTRACT

Combination head-protective helmet and communications system including a head-protective helmet and a flexible flame retardant earflap mounted removably to the helmet wherein a voice communications system including interconnected transceiver circuitry, microphone, speaker, battery and antenna is mounted on the earflap for quick and easy removal from the helmet with the earflap.

6 Claims, 2 Drawing Sheets

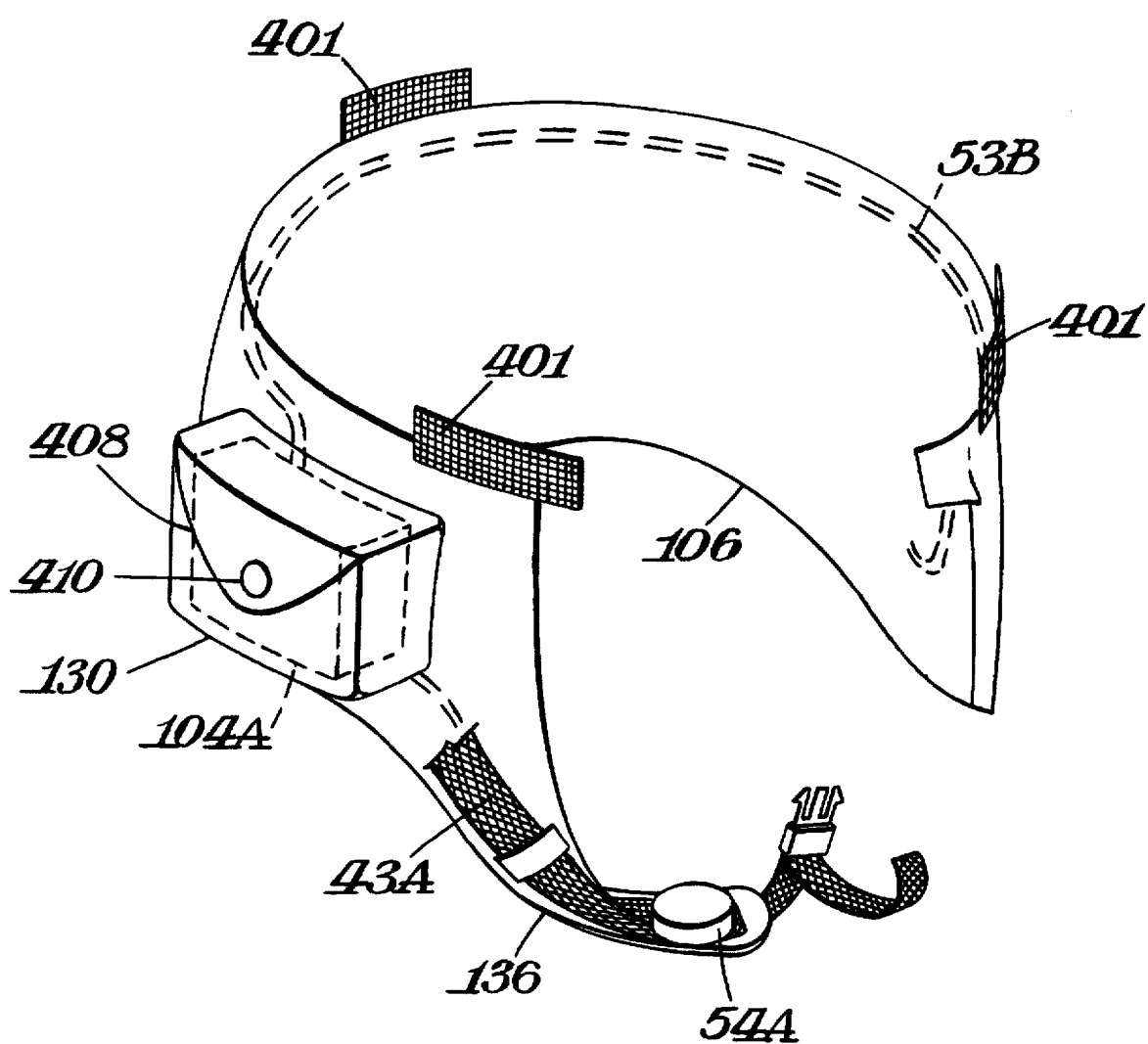

COMBINATION HEAD-PROTECTIVE HELMET AND COMMUNICATIONS SYSTEM

CROSS-REFERENCE TO RELATED APPLICATIONS

This application is related to U.S. patent application Ser. No. 07/716,707, entitled COMBINATION HEAD-PROTECTIVE HELMET & COMMUNICATIONS SYSTEM, filed on Jun. 18, 1991, now U.S. Pat. No. 5,404,577, which is a continuation-in-part application of U.S. patent application Ser. No. 07/553,438, entitled COMBINATION HEAD-PROTECTIVE HELMET & COMMUNICATIONS SYSTEM, filed on Jul. 13, 1990, now abandoned, both applications in the names of Lawrence H. Zuckerman, Kurt P. Schuler, Robert E. Gray and Robert J. Richter, and both applications assigned to the same assignee as this application.

BACKGROUND OF THE INVENTION

This invention relates generally to the combination of a head-protective helmet and a relatively short range voice communications system mounted thereon for generally hands-free use by personnel in the fields, for example, of firefighting, police, military, industrial and hazardous material handling, wherein the environment or type of work requires enhanced voice communications between such personnel in the immediate area, and preferably wireless hands-free voice communications. This invention also relates to enhanced hands-free relatively long-range voice communications between, for example, a group leader of such personnel and a distant communications center such as, for example, a relatively distant fire engine or distant fire company base station or repeater.

More particularly, the present invention is an improvement in the embodiment of a combination head-protective helmet and communications system illustrated particularly in FIGS. 14–17 of the above-identified U.S. Pat. No. 5,404,577 which application has been allowed and the issue fee paid and which application is incorporated herein by reference and referred to hereinafter as the "incorporated reference." The combination head-protective helmet and communications system embodiment shown in FIGS. 14–17 of the incorporated reference includes a head-protective helmet 20 including a hard outer shell or external 41 to which is removably mounted an internal impact cap 42 and a suspension system 43 (note particularly FIG. 3 of the incorporated reference) including a plurality of straps 49 for being engaged by the head of the wearer of the helmet 20, such as for example a firefighter, to suspend or support the helmet 20 on the head of the wearer of the helmet. A flexible flame retardant earflap 106 is mounted removably to the helmet 20, such as by opposed VELCRO® patches not shown, and the earflap 106 includes an interior or inner pocket 130 which receives a housing 104A which receives and houses the transceiver circuitry 52A (note FIG. 15 of the incorporated reference), the speaker 55A and battery 68. The flame retardant earflap 106 includes an extension portion 136 which is fastened under the chin of the wearer of the helmet 20 and a throat microphone 54A is mounted on the inner surface of the earflap extension portion 136, and, upon the extension portion 136 being fastened under the chin of the wearer of the helmet 20 the throat microphone 54A is placed in engagement with, and in voice communication with, the throat of the helmet wearer. An antenna 53A resides within, or underneath, the helmet 20 similar to the antenna 53 shown in FIG. 2 of the incorporated reference. The transceiver circuitry 52A, antenna 53A, battery 68, throat microphone 54A and speaker 55A are interconnected with the transceiver circuitry residing in the earflap pocket 130. Upon the extension portion 136 of the earflap being fastened on the chin of the wearer of the helmet 20, the speaker 104A is placed adjacent to and in voice communication with an ear of the wearer of the helmet 20.

In the embodiment of the combination head-protection helmet and communications system illustrated in FIGS. 14–17 of the incorporated reference, only the throat microphone 54A, speaker 55A, transceiver circuit 52A and battery 68 were mounted on the flexible flame retardant earflap 106 and the antenna was not mounted on the earflap 106 but instead was separately mounted to the helmet 20 so as to reside underneath the helmet 20 as noted above. This meant that upon it being desired to remove the voice communications system from the helmet so the helmet can be used separately, the flexible flame retardant earflap 106 was removed from the helmet 20 in one step, but a second more cumbersome step had to be performed, namely, the antenna 53A had to be unplugged from the transceiver circuitry as illustrated in FIG. 15 of the incorporated reference and the antenna had to be separately removed from the helmet. While this arrangement has been found work, it has also been found to be inconvenient to the wearer of the helmet 20, such as a firefighter, due to the requirement that the antenna must be unplugged from the transceiver before the flexible flame retardant earflap can be removed, and when the flexible flame retardant earflap is removed from the helmet 20 the antenna still resides underneath the helmet and must be separately removed.

Accordingly, it has been found that there is a need in the art for a communications system for use in combination with a head-protective helmet wherein the communications system may be quickly and easily removed from the helmet whereby the helmet can be quickly and conveniently used separately without the communications system.

Accordingly, it is the object of the present invention to provide a combination head-protective helmet and communications system wherein the communications system may be quickly and easily removed from the helmet by the helmet wearer, such as for example a firefighter.

SUMMARY OF THE INVENTION

It is the object of the present invention to satisfy the foregoing need in the art.

Combination head-protective helmet and communications system satisfying the foregoing need and embodying the present invention may include a head-protective helmet and a flexible flame retardant earflap mounted removably to the helmet wherein a voice communications system including interconnected transceiver circuitry, microphone, speaker, battery and antenna is mounted on the earflap for quick and easy removal from the helmet with the earflap.

DESCRIPTION OF THE DRAWING

FIG. 2 is a perspective view of an alternate embodiment of this invention.

DESCRIPTION OF THE PREFERRED EMBODIMENT

Figure 1:
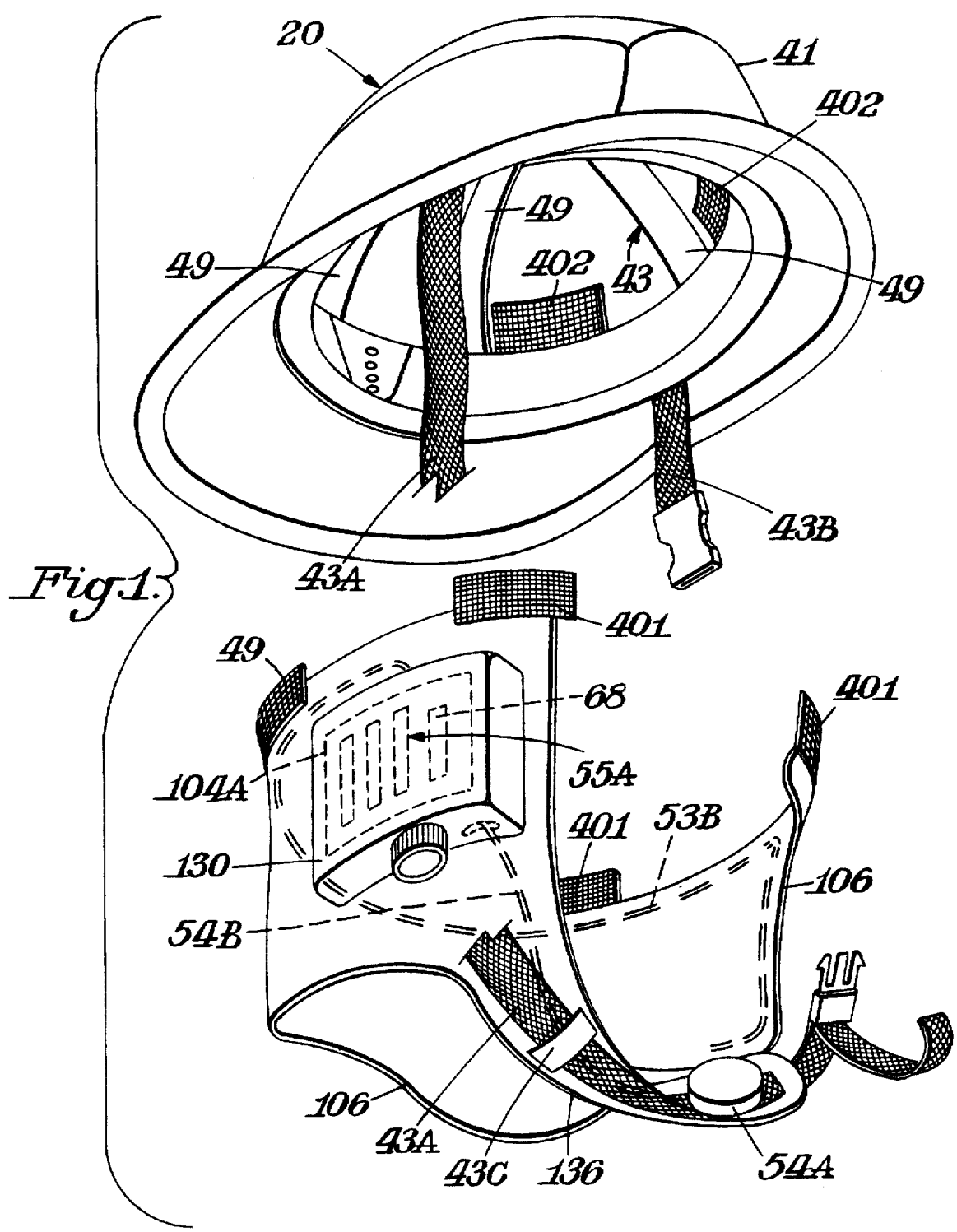
FIG. 1 is an exploded view of a combination head-protective helmet and communications system embodying the present invention.

Referring now to FIG. 1, elements of the combination head-protective helmet and communications system shown in the drawing which are the same, or substantially the same, as the corresponding elements shown in FIGS. 14–17 of the incorporated reference and described above, are given the same numerical designations in the FIGS. of this application. The flexible flame retardant earflap 106 is mounted removably to the interior of the internal impact cap 42 by VELCRO® patches 401 suitably secured, such as for example by stitching, to the upper exterior of the earflap 106 and by mating VELCRO® patches 402 secured to the inner surface of the internal impact cap 42. Upon these VELCRO® patches being placed in engagement with each other, the flame retardant earflap 106 is quickly and easily mounted removably to the internal impact cap 42 and thereby to the helmet 20 and the earflap 106 is easily and quickly removed from the internal impact cap 42 by disengaging the mated VELCRO® patches 401 and 402. The helmet 20 includes a head suspension 43 including a plurality of straps 49 for engaging the head of the wearer of the helmet and the suspension 43 also includes a pair of downwardly extending straps 43A and 43B for being fastened under the chin of the wearer of the helmet 20 to thereby fasten the earflap extension portion 136 under the chin of the helmet wearer; as will be noted from the drawing, strap 43A extends downwardly over the outside of the earflap 106 and through a loop 43C provided on the exterior of the earflap extension portion 136. The transceiver, including the transceiver circuitry 52A shown in FIG. 15 of the incorporated reference but not shown in FIG. 2, speaker 55A, battery 68 and antenna 53A, is received within a housing 104A which is in turn received and resides within the inner or interior pocket 130 provided on the earflap 106; the pocket 130 as shown in FIG. 14 of the incorporated reference, opens into the interior of the earflap 106 for ready access to and receipt of the housing 104A. The throat microphone 54A is mounted on the inner surface of the earflap extension portion 136 and is connected to the transceiver circuitry residing in the housing 104A by the wire indicated by the dashed line 54B. In the present invention, the antenna 53B is mounted suitably on the flexible flame retardant earflap 106 in a position to receive and transmit voice communications and in particular, as shown in dashed outline, the antenna 53B may reside interiorly of the earflap 106 which may be made suitably of a plurality of layers of flexible flame retardant material, such as for example NOMEX® made by the DuPont company, which layers may be suitably secured together such as by stitching, with the antenna 53B suitably sandwiched between such layers. The antenna 53B is also connected to the transceiver circuitry as indicated by the dashed outline diagrammatically illustrating the antenna 53B. It will be understood that the antenna 53B and the wire 54B may be provided with suitable connectors, such as the connectors 145 and 146 shown in FIG. 15 of the incorporated reference, to permit plug-in connection to the transceiver circuitry 52A. Suitable holes, not shown, will be provided in the earflap to permit the antenna 53B and wire 54B to pass therethrough for plug-in connection to the transceiver circuitry.

Upon the earflap extension portion 136 being fastened under the chin of the wearer of the helmet 20 by the straps 43A and 43B, the throat microphone 54A is placed in engagement with and in voice communication with the throat of the helmet wearer and the speaker 55A is placed adjacent to and in voice communication with the ear of the helmet wearer.

In brief summary, it will be understood that in the combination head-protective helmet and voice communication system of the present invention, the voice communication system including the interconnected transceiver circuitry, throat microphone 54A, speaker 55A, battery 68 and antenna 53B are all mounted on the flexible flame retardant earflap 106 which may be easily and quickly mounted to and removed from the helmet 20 by use of the matching VELCRO® patches 401 and 402 thereby permitting the quick and easy removal of the entire communications system from the helmet 20 and making the helmet quickly and conveniently ready for separate use.

An alternate embodiment of the present invention is illustrated in FIG. 2. In this embodiment, elements which are the same as the elements shown in FIG. 1 and described above are given corresponding numerical designations. This embodiment differs from the earlier embodiment in that the pocket which receives the housing 104 which receives the transceiver circuitry, battery and speaker, as noted above with regard to FIG. 1, is an outer or exterior pocket 130A; only the housing 104A is shown in FIG. 2, and it will be understood that such housing includes the aforenoted transceiver circuitry, battery and speaker. The outer pocket 130A may be made of suitable flexible flame retardant material of the type noted above and may be suitably secured to the earflap 106 such as by stitching. Outer pocket 130A is provided with a flap which may be suitably secured to the outer pocket 130A such as by the snap 410. Opening of the snap 410 permits easy entry and removal of the housing 104A, and in particular permits quick and easy replacement of the battery, or batteries, contained within the housing and to permit quick and easy removal of the housing. The speaker mounted in the housing 104A, not shown in FIG. 2 but which may be for example speaker 55A shown in FIG. 1, is positioned opposite the ear of the wearer of the helmet 20, FIG. 1, and the voice communications from the speaker will be transmitted through the flame retardant earflap material comprising the flexible flame retardant earflap 106 without undue diminution. Otherwise, the embodiment shown in FIG. 2 operates in the same manner as the embodiment of FIG. 1 and quick and easy removal of the entire voice communication system from the helmet is provided by the quick and easy removal of the earflap 106 from the helmet by the matching VELCRO® patches 401 and 402 (FIG. 1).

It will be understood that many variations and modifications may be made in the present invention without departing from the spirit and the scope thereof.

What is claimed is:

1. Combination head-protective helmet and communications system for providing head protection to the wearer of the helmet and generally hands-free voice communications between the wearer and others, comprising:

a head-protective helmet;

a flexible flame retardant earflap mounted removably to said helmet and including at least a portion extending downwardly therefrom to protect the ears of the wearer of the helmet from heat and flame, said earflap including an extension portion for being fastened under the chin of the wearer of said helmet;

a voice communications system including transceiver circuitry, antenna, throat microphone, battery and speaker collectively providing a complete system for voice communications between the wearer and others; and said voice communications system completely and totally mounted on said earflap to position said throat microphone to receive voice communication from said wearer of said helmet, to position said speaker adjacent an ear of said wearer of said helmet to transmit voice communication to said wearer of said helmet and to position all of said antenna on said earflap to receive and transmit voice communication whereby removal of said earflap from said helmet also removes the entire voice communications system from said helmet.

2. The combination head-protective helmet and communication system according to claim 1 wherein said earflap includes an extension portion for being fastened under the chin of said wearer, and wherein said throat microphone is mounted on said extension portion to place said microphone adjacent the throat of and in voice communication with said wearer of said helmet.

3. The combination head-protective helmet according to claim 1 wherein said earflap is provided with an inner pocket, and a housing receiving said transceiver circuitry, said battery and said speaker and wherein said housing resides in said pocket.

4. The combination head-protective helmet according to claim 1 wherein said earflap is provided with an outer pocket, and a housing receiving said transceiver circuitry, said battery and said speaker, and wherein said housing resides in said pocket.

5. The combination head-protective helmet according to claim 4 wherein said outer pocket is made of flexible flame retardant material and is provided with a flap for being snap fitted to said pocket to close said pocket and for being unsnapped from said pocket to open said pocket for entry and removal of said transceiver to and from said pocket.

6. The combination head-protective helmet according to claim 1 wherein said earflap includes a plurality of flexible layers secured to each other and said antenna is sandwiched between said layers.

* * * * *